Nov. 22, 1938.  P. PIERCE  2,137,585
WRAPPING MACHINE
Filed June 10, 1937  3 Sheets-Sheet 1

INVENTOR
PAUL PIERCE
BY Albert L. Ely
ATTORNEY

Patented Nov. 22, 1938

2,137,585

UNITED STATES PATENT OFFICE 2,137,585

WRAPPING MACHINE

Paul Pierce, Chicago, Ill., assignor to Pierce Wrapping Machine Company, Chicago, Ill., a corporation of Illinois Application June 10, 1937, Serial No. 147,519

11 Claims. (Cl. 242—6)

This invention relates to improvements in wrapping machines, for example, such as are used in wrapping tire casings and the like. More particularly the invention contemplates improvements in a wrapping machine of the type described and claimed in the patent to Herman Schoij, No. 1,824,374, granted September 22, 1931.

In the patent referred to, front and rear pairs of vertically flaring guide rollers are provided to receive and guide a tire to be wrapped, and these rollers are entirely satisfactory with certain types of tires. Recently, however, there has been increased activity in the manufacture of heavy pneumatic tires, for example, tractor tires and the like, having a variety of tread designs which include heavy, rough lugs, and such tires do not rotate freely during the wrapping operation when both pairs of guide rollers are arranged in a vertically flaring position because the movement of the tire with respect to at least one pair of these rollers is such that the latter tend to lodge between the lugs and stop or retard rotation of the tire. Accordingly, it is an object of this invention to provide rollers which will not interfere with the normal rotation of the tire while it is being wrapped.

Another object is to provide a spring means for holding at least one pair of the guide rollers against the tire during the wrapping operation.

Occasionally the paper breaks or comes to the end of a roll before a tire is completely wrapped and the operator has to reverse the rotation of the tire a short distance before permitting wrapping to continue. During this reverse movement of the tire it is desirable to prevent interference by the rollers catching on the lugs and it is a further object of the invention to provide manually operated means for moving at least one set of guide rollers completely out of contact with the tire when rotation of the latter is reversed.

During the wrapping operation tires are supported on two spaced apart rotatable drums and, although they may be easily rolled onto these drums, considerable difficulty has been experienced in removing the wrapped tires from the drums. Hence, it is a further object of this invention to provide means for lifting tires from one of the drums whereby they may be easily rolled out of the machine.

Other objects and advantages will become apparent from the following description taken in conjunction with the accompanying drawings.

Figure 1:
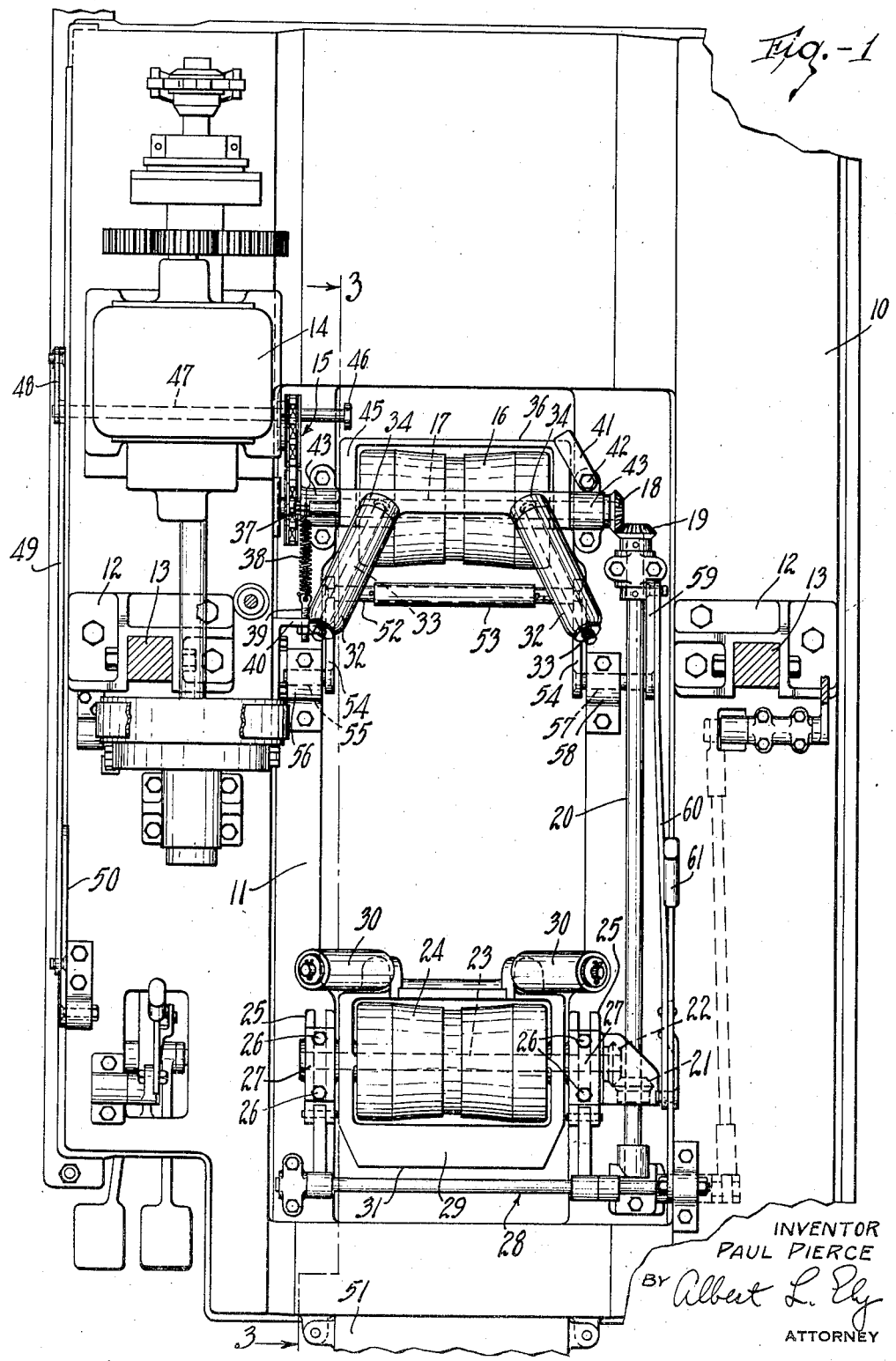
Fig. 1 is a partial plan view showing the lower portion of the machine, parts being cut away and shown in sections.

Since the type of wrapping machine with which my improvements are incorporated is well known in the art and is clearly shown in the aforesaid patent, I have not attempted to illustrate a complete wrapping machine, but have confined the drawings to the improvements and so much of the machine as is necessary to understand the improvements.

The machine is supported on a base 10, the central portion of which is provided with a trough 11 in which a tire is located while being wrapped and through which it passes into and out of the machine. Intermediate the ends of the base, standards 12 are provided on opposite sides of the machine, outside of the trough, which receive vertical guide posts 13 connected at their upper ends by a cross-head (not shown). Guide posts 13 are adapted to support in the customary manner an adjustable rotary shuttle mechanism and all parts associated therewith which are necessary to continuously wrap paper or the like around a tire that extends into the shuttle, the details of this mechanism being available in said Patent No. 1,824,374.

Base 10 also supports a motor 14 which may be utilized to drive the shuttle mechanism previously referred to, and through the medium of connections, referred to as a whole by the numeral 15, is adapted to rotate a tire supporting drum 16 carried on a rotatable shaft 17. The latter shaft carries a bevel pinion 18 which meshes with a similar pinion 19 carried on the end of a longitudinally extending rotatable shaft 20. A bevel pinion 21 is also carried on shaft 20 and meshes with a similar pinion 22 on shaft 23 of a rotatable tire supporting drum 24, the arrangement being such that drums 16 and 24 are driven in unison. Drum 24 and its shaft 23 are mounted for movement toward and from drum 16, the shaft being supported in boxes 25 slotted so as to slide on the base of the machine, and guiding pins 26 having their upper ends connected by plates 27 are received in the slots in the boxes. The latter are connected to suitable mechanism, indicated as a whole by numeral 28, whereby they may be adjusted toward and from drum 16 in the manner referred to in the aforesaid patent. Preferably, adjustment of the shuttle and drum 24 takes place simultaneously, in accordance with the disclosure in said patent, whereby the correct position of the tire for obtaining the proper lead of wrapping paper is assured at all times. Drum 24 has associated therewith a pivoted plate 29 which supports a pair of guide rollers 30 counterweighted as at 31, which assist in keeping the tire centrally of the machine. When no tire is in the machine, rollers 30 assume a vertically flaring position.

The foregoing parts are all of standard construction and form no part of the present invention except in combination with the improvements to be described. Referring now to drum 16, a pair of spaced rollers 32 are mounted for rotation on stub shafts 33 which are carried by lugs 34 projecting from a cross-member 35 extending across drum 16. Member 35 is pivotally mounted on opposite sides of drum 16 on shaft 17 and carries a counterweight 36. The arrangement is such that rollers 32 are pivotally mounted for movement around shaft 17 and when no tire is in the machine, these rollers assume substantially a horizontally outwardly flaring position, as shown in Fig. 1, although they extend slightly upwardly from a true horizontal position, as clearly shown in the full line position in Fig. 2. This position will be referred to as their normal position.

A pin 37 extends outwardly from one end of member 35 and receives one end of a coil spring 38, the opposite end of which is secured to a bolt 39 adjustably threaded to a flange 40 carried on the base of the machine. This spring supplements the action of counterweight 36 and tends constantly to urge rollers 32 toward their normal position. In order to prevent movement of these rollers past their normal position, a stop member 41 is arranged in the path of travel of counterweight 36, said stop member being secured as at 42 to one of the bearings 43 of shaft 17.

Figure 3:
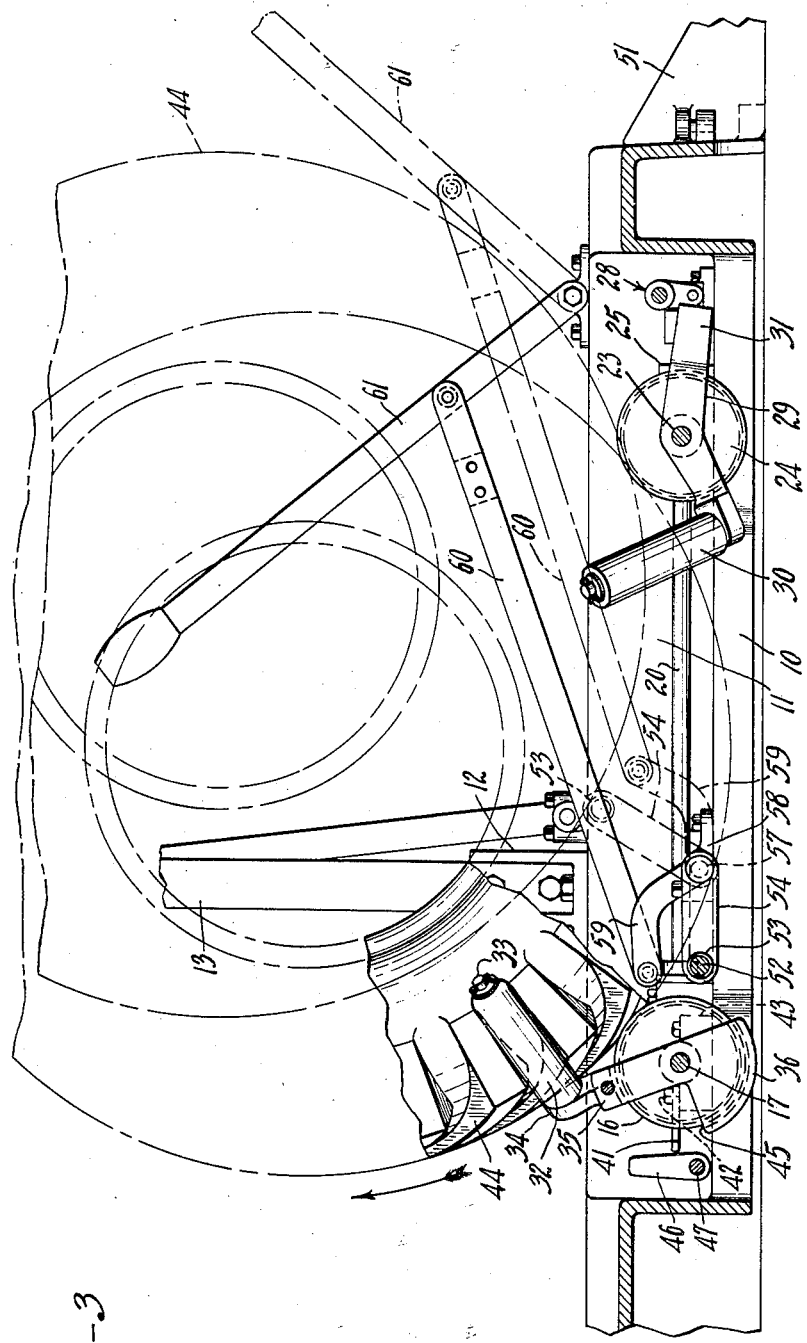
Fig. 3 is a section taken substantially on line 3—3 of Fig. 1.

With rollers 32 arranged in the normal position referred to, when a tire 44 is placed in the machine for wrapping, these rollers will be tilted backwardly substantially to the position shown in Fig. 3, whereby they will assist rollers 30 in guiding the tire while it is being wrapped, yet will permit free rotation of a tire having heavy lugs such as illustrated. Of course, when a tire is in the machine, spring 38 constantly urges and holds rollers 32 in contact with the tire.

If the wrapping paper should break or come to the end of a roll while a tire is being wrapped, it is necessary to reverse the direction of rotation of the tire before resuming wrapping, since the tire usually cannot be stopped as soon as the loss of paper is discovered. In reversing its rotation, if rollers 32 are permitted to maintain their position in contact with the tire, these rollers would tend to catch on the tire lugs and interfere with the rotation of the tire. Hence, under these conditions, it is desirable to move rollers 32 completely out of contact with the tire.

Figure 2:
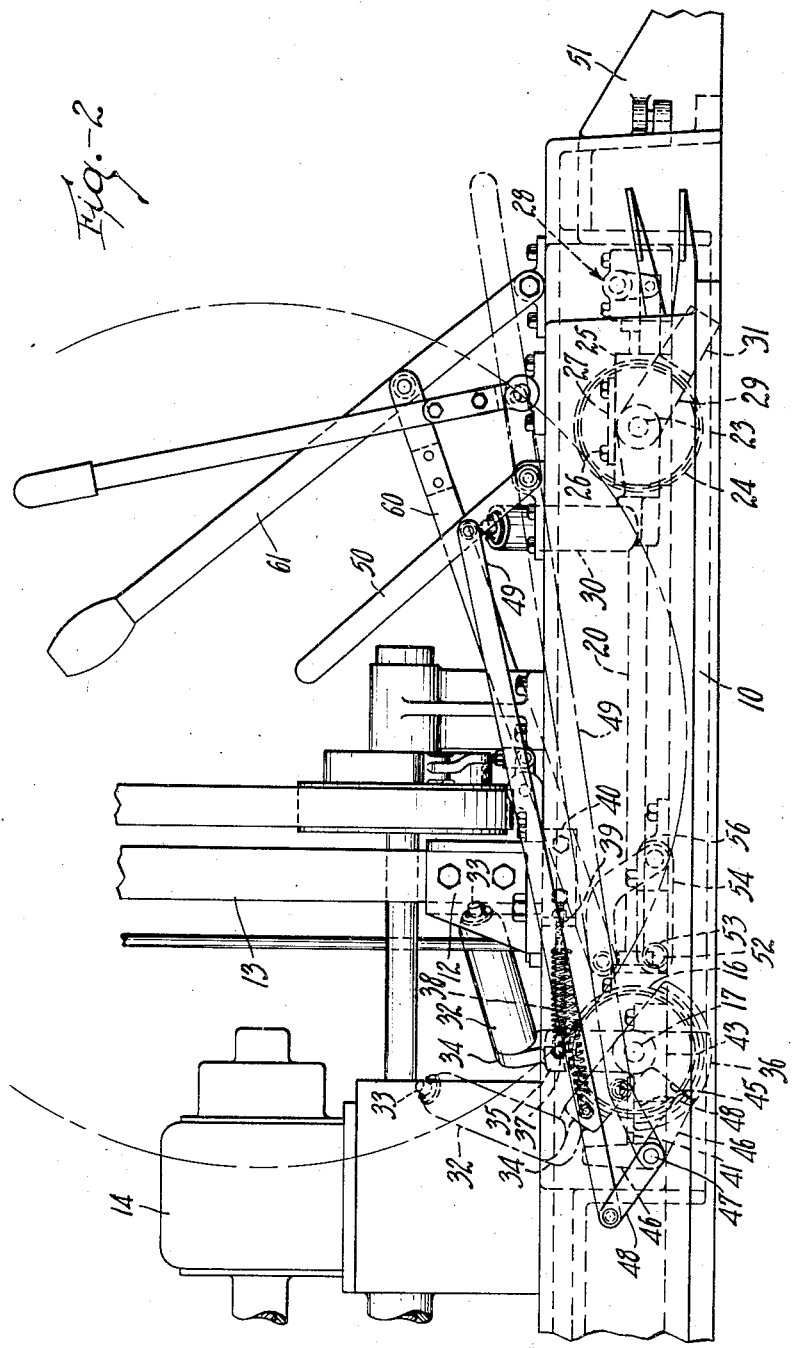
Fig. 2 is a partial side elevation.

Referring particularly to Fig. 2 it will be noted that the upper rear surface of counterweight 36 is flattened to provide a ledge or cam surface 45. Rearwardly of this counterweight a rocker arm or cam 46 is arranged to engage ledge 45 and swing rollers 32 to the broken line position shown in Fig. 2, out of contact with the tire. Arm 46 is fixed to one end of a rock shaft 47 which is journaled in the base of the machine and extends outwardly thereof as shown in Fig. 1. The opposite end of shaft 47 has one end of a link 48 fixed thereto whereby substantially a bell crank action is obtained between shaft 47, arm 46 and link 48 whenever the latter is moved from the full line to the broken line position shown in Fig. 2. The other end of link 48 has one end of a rod 49 secured thereto and the opposite end of this rod is secured to a hand lever 50 to permit swinging of rollers 32 by lever 50. When lever 50 reaches the broken line position shown in Fig. 2 it will be on center or slightly over center with respect to its connection with rod 49, and rollers 32 will thereby be locked out of contact with the tire. To return rollers 32 into engagement with the tire it is only necessary to move arm 46 out of the path of travel of counterweight 36 and spring 38 will immediately swing the rollers back to tire-engaging position.

Heavy tires are easily rolled into the machine with the assistance of the runway 51 and drum 24, but since they extend downwardly into the space between drums 16 and 24 it is difficult to remove them by hand. Accordingly, I provide means for lifting the rear end of the tire whereby it easily may be rolled out of the machine. As shown, a lifting bar 52 is arranged in front of drum 16 and has a roller 53 thereon which cooperates with the tire in removing the latter from the machine. The ends of bar 52 are secured to the outer ends of parallel links 54 and one link 54 has its inner end fixed to a stub shaft 55 journaled in bearing 56 on the base of the machine. The other link 54 has its inner end fixed to a rock shaft 57 journaled in bearing 58 on the base, the arrangement being such that when shaft 57 is rocked, links 54 will swing about their pivot points and raise bar 52, thereby lifting the portion of the tire resting on drum 16.

Shaft 57 extends outwardly of bearing 58 and has secured thereto one end of a curved link 59, the other end of which is secured to a rod 60 connected to a hand lever 61. When hand lever 61 is moved from the full line to the broken line position of Fig. 3, bar 52 will raise the tire 44 to the upper position in Fig. 3 whereby with the cooperation of drum 24 the tire easily may be rolled out of the machine. As lever 61 passes a vertical position, as shown in Fig. 3, it will lock itself against accidental return movement whereby the weight of the tire will be unable to force bar 52 back to its lower position. Similarly, as links 54 pass a vertical position and assume the broken line position of Fig. 3 they become locked in the latter position and must be manually returned to their inoperative position.

It is believed that the operation of my improvements has been made sufficiently clear and further detailed statements of their operation are unnecessary. The improvements are well adapted to accomplish the objects and advantages for which they are intended. By virtue of the new arrangement of the rear guide rollers, freedom of rotation of the tires during wrapping is assured, and the rollers can be moved out of engagement with the tire when necessary. Also, removal of the tires is made a relatively simple operation.

It is to be understood that while I have shown and described the preferred embodiment of my invention, the invention is not so limited and various modifications may be made therein without departing from the spirit of the invention or from the scope of the subjoined claims.

What is claimed is:

1. In a machine for wrapping annular articles, spaced drums for supporting said articles in an upright position, a pair of guide rollers pivotally cooperating with each drum, one pair of rollers being normally arranged in a vertically flaring position, and the other pair being normally arranged in a substantially horizontally flaring position.

2. In a machine for wrapping annular articles, spaced drums for supporting said articles in an upright position, a pair of guide rollers pivotally cooperating with each drum, one pair of rollers being normally arranged in a vertically flaring position, and the other pair being normally arranged in a substantially horizontally flaring position, and spring-pressed means constantly urging the latter pair of rollers into their normal position.

3. In a machine for wrapping annular articles, spaced drums for supporting said articles in an upright position, a pair of guide rollers pivotally cooperating with each drum, one pair of rollers being normally arranged in a vertically flaring position, and the other pair being normally arranged in a substantially horizontally flaring position, spring-pressed means constantly urging the latter pair of rollers into their normal position, and means arranged in the path of movement of said first-mentioned means for limiting the action of said first-mentioned means to prevent movement of the latter pair of rollers past their normal position.

4. In a machine for wrapping annular articles, spaced drums for supporting said articles in an upright position, a pair of guide rollers pivotally cooperating with each drum, one pair of rollers having a counterweight adapted to normally maintain its associated rollers in a vertically flaring position, the other pair of rollers having a counterweight supplemented by a spring for normally maintaining its associated rollers in a substantially horizontally flaring position.

5. In a machine for wrapping annular articles, spaced drums for supporting said articles in an upright position, a pair of guide rollers pivotally cooperating with each drum, one pair of rollers having a counterweight adapted to normally maintain its associated rollers in a vertically flaring position, the other pair of rollers having a counterweight supplemented by a spring for normally maintaining its associated rollers in a substantially horizontally flaring position, and means arranged in the path of movement of said last-mentioned counterweight preventing movement of the latter pair of rollers past their normal position.

6. In a machine for wrapping annular articles, spaced drums for supporting said articles in an upright position, a pair of guide rollers pivotally cooperating with one of said drums to guide said articles, spring-pressed means for constantly urging said rollers into contact with said articles, and means engageable with said first-named means for rendering ineffective said first-named means, and for temporarily eliminating the cooperation of said guide rollers in guiding said articles.

7. In a machine for wrapping annular articles, spaced drums for supporting said articles in an upright position, a pair of guide rollers pivotally cooperating with one of said drums to guide said articles, a counterweight cooperating with said rollers to urge the latter into contact with said articles, a spring supplementing the action of said counterweight, and pivoted means movable into engagement with said counterweight to render ineffective the action of said counterweight and spring, and to temporarily eliminate the cooperation of said guide rollers in guiding said articles.

8. A combination as recited in claim 7 wherein said counterweight is provided with a cam surface and said means comprises a manually operable cam engageable with said cam surface.

9. A combination as recited in claim 7 wherein said counterweight is provided with a cam surface and said means comprises a cam engageable with said cam surface, a rock shaft carrying said cam, a link secured to said rock shaft, a rod connected to said link, and a hand lever connected to said rod.

10. In a machine for wrapping annular articles, the combination of a pair of spaced drums for supporting said articles in an upright position, a pivoted bar arranged intermediate said drums but closer to one than to the other drum, and manually operable means for raising said bar to lift said articles from the surface of at least one of said drums to a height sufficient to enable the articles to be easily rolled over the other of said drums.

11. A combination as recited in claim 10 wherein said means comprises spaced parallel links secured to opposite ends of said bar, spaced rocker shafts to which said links are secured, another link secured to one of said rocker shafts, a rod connected to said last-named link, and a hand lever connected to said rod.

PAUL PIERCE.